June 11, 1935.　　　J. W. MENEFEE　　　2,004,414
BOBBER
Filed Nov. 20, 1933
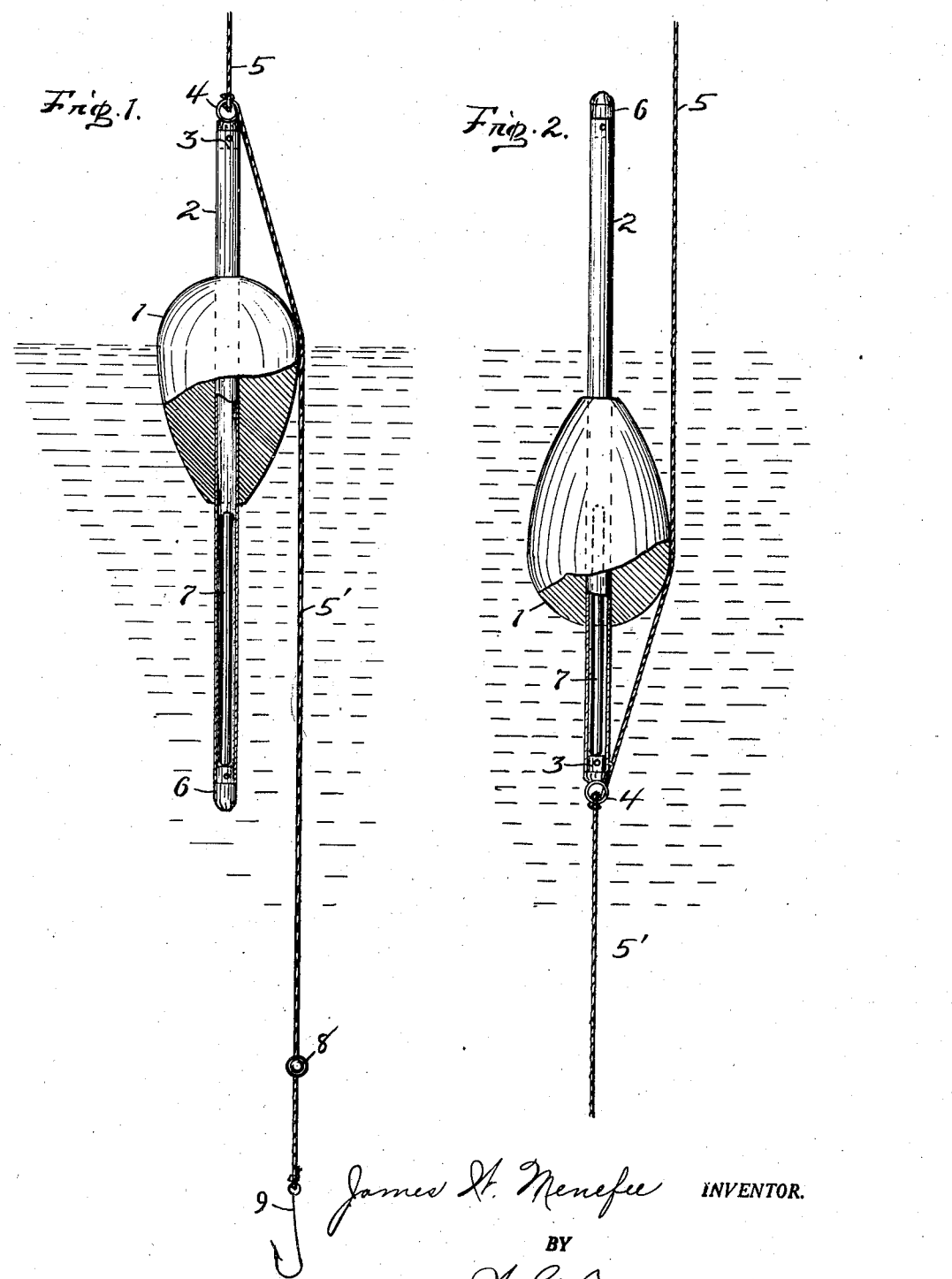

Patented June 11, 1935

2,004,414

UNITED STATES PATENT OFFICE 2,004,414

BOBBER

James W. Menefee, Fort Wayne, Ind.

Application November 20, 1933, Serial No. 698,743

1 Claim. (Cl. 43—49)

This invention relates to improvements in bobbers for fishing, and one of the objects thereof is to provide a float, attachable to a fish-line, that will normally remain erect with a portion thereof exposed above the water and which will become inverted when the line is drawn downwardly by the quarry and remain in such inverted position until the line is drawn upwardly by the operator, whereupon the bobber will reassume and retain its normal erect position until the line is subsequently drawn downwardly as in the first instance.

Another object is to provide a bobber so constituted that by change of its position while floating in the water the fisherman will be apprised upon observation of the float whether or not the baited hook on the line has been disturbed by the quarry previous to the time of observation.

Other objects and advantages of the invention will appear in the following description.

An illustrative embodiment of the invention is shown in the accompanying drawing, in which:—

Fig. 1 is an elevation of a bobber embodying the invention, a portion thereof being broken away, and including a fish-line attached thereto, the position of the bobber being normal; and Fig. 2 is another elevation of the bobber after its position is reversed by downward pull on the baited end of the line to which it is attached.

The illustrative embodiment of the invention consists of a float 1, preferably of cork and which may be of any desired shape. The float has an axially disposed tube 2, secured therein, closed at its top by a stop 3 provided with an eye 4 for the attachment of a fish-line 5, and which tube is closed at its lower end by a stop 6. The tube 2 constitutes a continuous guide for a plummet 7 that has free longitudinal movement therein limited at the ends of the tube by the stops 3 and 6.

The plummet 7 consists of a single piece of metal in the form of a shaft that fits loosely within the tube and is so constituted as to move bodily from one end of the tube to the other by gravital force accordingly as the vertical position of the bobber is reversed.

The fish-line 5 is adjustably attached to the eye 4 and has a portion 5' that depends therefrom and which is provided, as in ordinary tackle, with a sinker 8 and hook 9.

In use, the line 5 is preferably attached to the end of a fish pole (not shown), and when the bobber together with the sinker and hook are cast into the water, the float, being buoyant, is sustained at the surface of the water in view of the operator and assumes an erect position while the plummet is located in the lower end of the tube. When, if ever, the pendent end of the line is drawn downwardly by the quarry, the bobber becomes inverted in the water, whereupon, the plummet, because of gravitation, suddenly moves to the opposite end of the tube, and the bobber thereby is sustained inverted in the water in which position it remains until the fish-line is again drawn upwardly by elevating the pole, causing the bobber and the plummet to reassume their normal positions. The bobber when inverted signifies that the hook of the pendent end of the line has been disturbed and that a catch is impending.

What I claim is:—

In a fish line bobber, a float, a tube secured in and extending axially through the float, each end thereof extending beyond the corresponding end of said float and having a stop located at its outer extremity, a plummet consisting of a shaft loosely disposed in said tube having longitudinal free guided movement therein limited by said stops, and a fish line connected to one end only of said tube and having a pendent portion provided with a hook, the other end of said tube being free respecting said line.

JAMES W. MENEFEE.